Nov. 18, 1969  R. L. SHELLHAUSE  3,478,517
BRAKE MASTER CYLINDER

Filed May 21, 1968  2 Sheets-Sheet 1

INVENTOR.
Ronald L. Shellhause
BY
D. D. McGraw
ATTORNEY

Nov. 18, 1969   R. L. SHELLHAUSE   3,478,517
BRAKE MASTER CYLINDER

Filed May 21, 1968   2 Sheets-Sheet 2

INVENTOR.
Ronald L. Shellhause
BY
D. D. McGraw
ATTORNEY

United States Patent Office 3,478,517
Patented Nov. 18, 1969

3,478,517
BRAKE MASTER CYLINDER
Ronald L. Shellhause, Vandalia, Ohio, assignor to General Motors Corporation, Detroit, Mich., a corporation of Delaware
Filed May 21, 1968, Ser. No. 730,879
Int. Cl. F15b 7/08; B60t 11/22
U.S. Cl. 60—54.6                    11 Claims

ABSTRACT OF THE DISCLOSURE

A multiple circuit brake system has a dual master cylinder in which, in the event of pressure loss in a part of the system, the brake pedal travel loss is kept to a minimum. A pressure sensitive mechanism within the master cylinder senses the normal build-up of fluid pressure in the primary pressurizing chamber when the brake pedal is moved in the brake actuating direction. So long as a normal pressure build-up occurs, the pressure sensitive mechanism moves a normally locked detent or other locking arrangement into an unlocked position. If normal pressure build-up does not occur with brake pedal movement in the brake actuating direction, the locking mechanism will remain in a locked position. The brake pedal force is then transmitted to the secondary pressurizing piston through the locking mechanism without requiring the full stroke of the primary piston.

---

The invention relates to a dual master cylinder arrangement in which brake pedal travel loss is kept to a minimum when brake fluid pressurization does not take place in the primary pressurizing chamber of the master cylinder. The dual master cylinder primary pressurizing chamber is provided with a pressure sensitive release device which, when unpressurized, remains in the locked position. A predetermined amount of primary piston travel is permitted in order to build up primary chamber pressure under normal conditions. If the release pressure has not been attained within the predetermined amount of primary piston pressurizing movement, the locking device will remain locked and brake pedal force will be mechanically transmitted from the primary piston to the secondary piston through the locking device and the spring retainer for the primary piston return spring. This will therefore not require the full stroke of the primary piston in order to move the seconday piston in the pressurizing direction.

Figure 1:
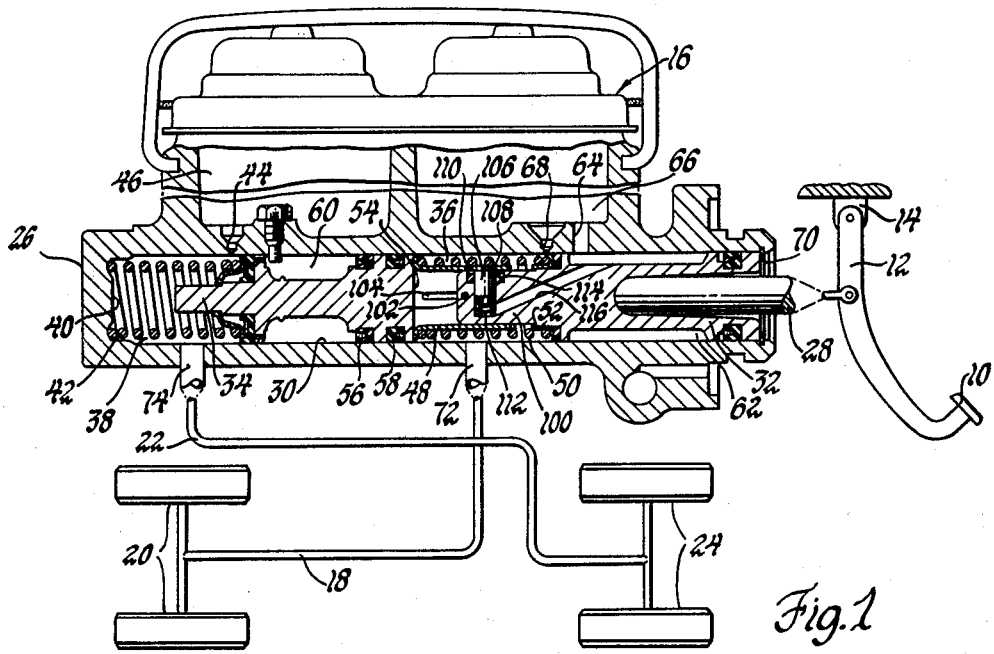
Figure 2:
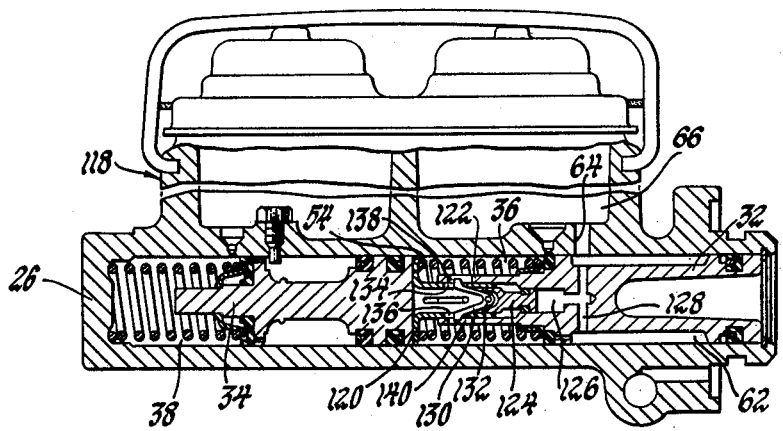
Figure 3:
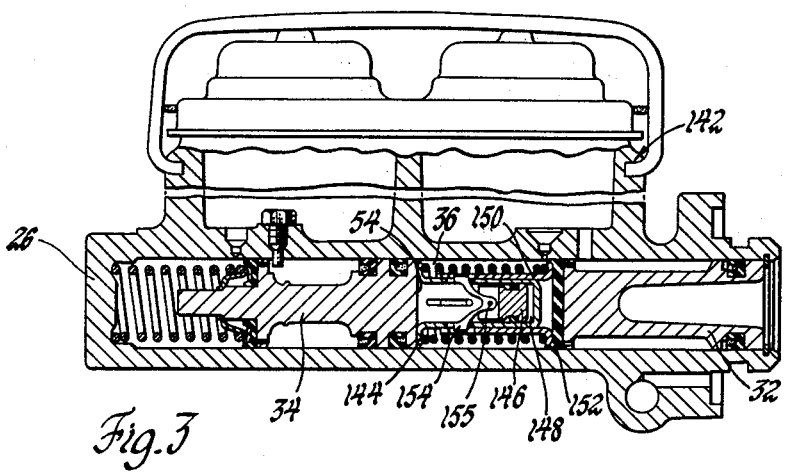
Figure 4:
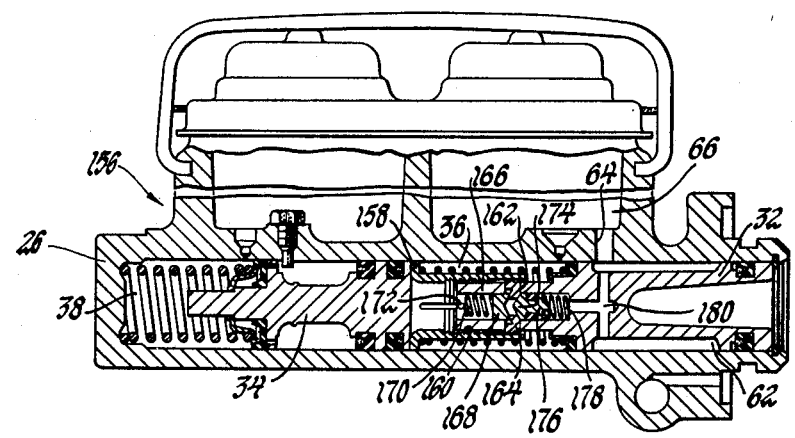
Figure 5:
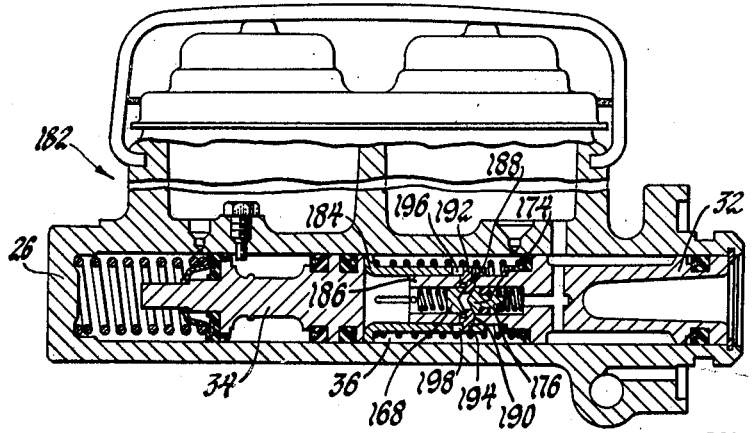

In the drawings:
FIGURE 1 is a schematic illustration of a vehicle brake system having a master cylinder embodying the invention, with parts broken away and in section;
FIGURE 2 shows a modified master cylinder embodying the invention and usable in the system of FIGURE 1, with parts broken away and in section;
FIGURE 3 shows another modified master cylinder embodying the invention and usable in the system of FIGURE 1, with parts broken away and in section;
FIGURE 4 shows another modified master cylinder embodying the invention and usable in the system of FIGURE 1, with parts broken away and in section; and
FIGURE 5 shows another modified master cylinder embodying the invention and usable in the system of FIGURE 1, with parts broken away and in section.

The brake system of FIGURE 1 includes a brake pedal 10 mounted on a pedal arm 12 which is suitably pivoted to a portion 14 of the vehicle to be braked. The pedal arm 12 is suitably connected, either directly through a push rod or indirectly through a suitable booster, to actuate the master cylinder assembly 16 so that brake fluid is pressurized in the conduit 18 to actuate the vehicle front wheel brakes 20, and brake fluid is also pressurized in conduit 22 to actuate the vehicle rear wheel brakes 24. This is a typical dual brake circuit arrangement. However, other dual circuit arrangements may be utilized.

The master cylinder assembly 16 has a body 26 mounted to receive the push rod 28, which is operatively connected to the brake pedal arm 12. A bore 30 has received therein a primary pressurizing piston 32 engaged by the push rod 28, and a secondary pressurizing piston 34. The walls of the cylinder bore 30 and the pistons cooperate to define the primary pressurizing chamber 36 intermediate the two pistons, and the secondary pressurizing chamber 38 between the secondary piston 34 and the forward end 40 of the bore 30. A secondary piston return spring 42 is positioned in chamber 38 and acts against the secondary piston to urge it rearwardly so that in the released position chamber 38 is connected through compensating port 44 to the brake fluid reservoir section 46. A spring retainer 48 fits about the forward end of the primary piston 32 and is flared outwardly to provide a seat for the forward end of the primary piston return spring 50. The rear end of spring 50 seats against a spring seat 52 which is urged against a shoulder formed on a part of the primary piston 32 by the force of spring 50. The forward end of spring retainer 48 engages the secondary piston rear face 54. Suitable seals 56 and 58 are provided on a rear land of the secondary piston 34 so that the primary pressurizing chamber 36 is sealed from the secondary compensating chamber 60 provided between the lands of the secondary piston 34. A primary compensating chamber 62 is provided between forward and rearward lands formed on the primary piston 32 and is connected by means of port 64 with the brake fluid reservoir section 66. A compensating port 68 connects the primary pressurizing chamber 36 with the reservoir section 66 when the primary piston is in the released position shown. A suitable piston stop 70 is provided at the rear end of the bore 30 against which the primary piston rests when the brakes are released. A suitable primary outlet port 72 connects the primary pressurizing chamber 36 with the conduit 18. A secondary outlet port 74 connects the secondary pressurizing chamber 38 with the conduit 22. To the extent that the master cylinder assembly 16 has been so far described, it is a conventional dual chamber master cylinder of the type commonly used in automotive vehicles at this time.

The master cylinder construction embodying the invention as shown in FIGURE 1 will now be described. A reduced area end 100 of the primary piston 32 is provided at its forward extremity with a cross pin 102 which acts as a guide and a stop pin. This pin extends outwardly beyond the diameter of the piston reduced area end 100 and into slots extending longitudinally in the spring retainer 48, one such slot 104 being illustrated. A small chamber is provided in the piston reduced area end 100 by a transverse bore in which the pressure sensitive detent 106 is reciprocably mounted for movement transversely of the piston. The outer end of detent 106 has a reduced end 108 which is shown extending into an aperture 110 formed in the side wall of the spring retainer 48. The aperture is formed as a slightly elongated slot to provide for some lost motion between the spring retainer 48 and the detent end 108, even though the detent end extends into the aperture. The pressure sensitive detent 106 is urged outwardly by a spring 112 within the detent bore, and the detent bore is sealed from the primary pressurizing chamber by means of seal 114. A passage 116 connects the inner end of the detent bore with the compensating chamber 62, the passage being suitably formed through the primary piston 32.

In normal brake operation, the brake pedal 10 is moved by the vehicle operator to move push rod 28 to the left.

Primary piston 32 is therefore moved in a fluid pressurizing direction. Since cross pin 102 is in slot 104, the primary piston may move relative to the spring retainer 48. This movement is also permitted by the elongated nature of aperture 110, with detent end 108 moving forwardly in that aperture. This forward movement is sufficient to pressurize brake fluid in primary pressurizing chamber 36 to such an extent that the pressure acting on the outer end of detent 106 causes detent spring 112 to be compressed, moving the detent inwardly in the detent bore so that the detent end 108 no longer extends into the spring retainer aperture 110. This pressure differential is permitted since the other side of the detent 106 is exposed to reservoir pressure through passage 116, chamber 62, and port 64. The pressure generated in chamber 36 will also act on piston face 54 of the secondary piston, moving that piston forwardly to also pressurize fluid in the secondary pressurizing chamber 38. Thus the front and rear vehicle brakes will be pressurized. If, however, there is no pressure generated in chamber 36 for any reason during the pressurizing movement of primary piston 32, the detent end 108 will continue to be in the locked position relative to spring retainer 48. When the detent end reaches the forward end of aperture 110 under these conditions, further movement of the brake pedal 10 will generate a force which is mechanically transmitted from the primary piston 32 through the detent 106 and the spring retainer 48 to the secondary piston 34, thereby pressurizing brake fluid in secondary chamber 38. Thus the only brake pedal travel loss is that which will move the detent end 108 from the rear position shown to the forward end of aperture 110, after which pressurizing force is delivered mechanically to secondary piston 34. This gives a greater amount of reserve brake pedal movement for pressurization of fluid in secondary chamber 38 than would otherwise be obtained. The brake pedal does not have to be moved until primary piston 32 engages secondary piston 34, or pin 102 engages the forward end 104, or the rear end of retainer spring 48 engages spring seat 52, whichever would occur first depending upon the particular design.

The modified master cylinder 118 shown in FIGURE 2 has a generally similar construction. In this instance, however, the spring retainer 120 which engages the rear face 54 of the secondary piston 34 extends rearwardly within an axially extending bore formed in the reduced area end 122 of the primary piston 32. The rear end of the piston bore reciprocably receives a pressure sensing piston 124 and provides therewith a chamber 126 which is at the pressure in reservoir section 66. Chamber 126 is connected to reservoir section 66 through cross passage 128, chamber 62, and port 64. A V-shaped sear 130 is pivotally secured at its center by sear pin 132 to the forward end of pressure sensing piston 124. The outer ends of sear 130 extend through apertures 134 and 136 formed in spring retainer 120 and into slotted apertures 138 and 140 formed in the primary piston reduced area end 12.

When the brakes are in the released position the sear 130 is in the position shown in FIGURE 2. It therefore is in the locked position. During normal operation, pressurization of brake fluid in primary pressurizing chamber 36 acts against the area of pressure sensing piston 124 exposed to that chamber pressure, moving the piston 124 rearwardly and pulling sear 130 with it. Since the sear has spring-like arms, these arms are deflected inwardly, pulling the arm ends out of apertures 138 and 140 to unlock the mechanism. If no pressure is generated in primary pressurizing chamber 36, the arms remain in the locked position and when the lost motion permitted by the elongated nature of slots 138 and 140 relative to the sear ends is taken up, the brake applying force is mechanically transmitted from the primary piston 32 through the sear ends to the spring retainer 120 to the secondary piston 34.

In the modification shown in FIGURE 3, the master cylinder 142 has a somewhat different arrangement. The primary piston spring retainer 144 engages the piston face 54 of the secondary piston 34, and is constructed in a hat shape so that pressure sensing piston 146 is received therein in sealing relationship and the closed chamber 148 at the end of the hat section has no connection with fluid in primary pressurizing chamber 36, but instead contains air normally at atmospheric pressure. The rear primary piston spring retainer 150 receives the hat section of the spring retainer 144 in telehcoping relationship and abuts against the primary cup 152. The sear 154 is constructed in a manner similar to the sear 130 of FIGURE 2 so that its ends extend through elongated slots formed in spring retainer 144 and into slightly elongated apertures formed in the cylinder wall-like portion of the rear spring retainer 150. The sear 154 is connected by the sear pin 155 to the pressure sensing piston 146.

It can be seen that as the primary piston 32 is moved in the fluid pressurizing direction, fluid pressure generated in chamber 36 acts on piston 146 to decrease the volume of atmospheric pressure in chamber 148, causing relative movement of the piston 146 and the spring retainer 144, thereby moving the ends of sear 154 inwardly until they clear the apertures formed in the rear spring retainer 150. Thus the mechanism is unlocked. If no pressure is generated in chamber 36 by the pressurizing movement of piston 32, the sear remains in the locked position and when the lost motion provided by the apertures is taken up, brake pedal force is transmitted mechanically from piston 32 through spring retainer 150, sear 154, and spring retainer 144 to the secondary piston 34.

The master cylinder 156 shown in FIGURE 4 has another modification of the locking mechanism. In this instance the spring retainer 158 has ratchet teeth 160 formed on the inner wall of the body thereof and engageable with similar teeth formed on the outer ends of the detents 162 and 164. These detents are mounted in cross passages extending through the primary piston reduced end 166 about which the spring retainer 158 extends. A center bore formed in the primary piston reduced end 166 has a cam 168 in the forward end thereof. Cam 168 is urged by a cam spring 170. The spring reacts against the guide and stop pin 172 extending across the forward end of the piston and into suitable guide slots formed in the spring retainer 158. As seen in cross section, the rear face of cam 168 is V-shaped. Another cam 174 is formed as a part of the pressure sensing piston 176 and is received in the rear portion of the axial bore formed in the primary piston. The forward face of cam 174 is shaped so that it complements the rear face of cam 168. The detents 162 and 164 have inner ends extending between the two cam faces so that when the cams are urged rearwardly the detents are moved radially inwardly, and when cam 174 is urged forwardly, the cams cooperate to move the detents radially outwardly. The rear side of piston 176 has a spring 178 urging the piston and the cam 174 forwardly. The rear face of piston 176 is exposed to reservoir pressure through passage 180, primary piston compensation chamber 62, and port 64 connecting with reservoir section 66.

In normal operation, pressurizing movement of the primary piston 32 generates pressure in the primary pressurizing chamber 36 which acts on the forward face of piston 176, moving it rearwardly against the force of spring 178. Cam spring 170 causes cam 168 to move rearwardly, following the cam 174 of piston 176. The camming action on the detents 162 and 164 causes the detents to move inwardly and therefore out of locking position. If no pressure is generated in primary pressurizing chamber 36 as the primary piston is moved to the left, the detent teeth will engage the teeth 160 of the spring retainer and the brake pressurizing force will be transmitted mechanically to the secondary piston 34. This construction has an additional advantage in that if pressure is lost in chamber 36 while the brakes are being applied, the piston 176 will immediately move forwardly, and the cams 168 and 174 will move detents 162 and 164 outwardly to engage their teeth with the spring retainer teeth 160 in whatever relative position they may be in at the time. Thus the mechanical connection is immediately made upon loss of pressure in chamber 36 so that the brake pedal does not fall appreciably without any pressurizing effect. Instead, it will maintain substantially the same height as before so that further brake pedal movement can further pressurize the brake fluid in the secondary pressurizing chamber 38.

The master cylinder 182 shown in FIGURE 5 includes another modification of the locking mechanism similar to that of FIGURE 4 in its manner of locking and unlocking, but utilizing the detent construction contained in the master cylinder 16 of FIGURE 1. The spring retainer 184 telescopes over the primary piston reduced end 186. The same cams 168 and 174 and piston 176 are utilized in the same arrangement as that shown in FIGURE 4. The detents 188 and 190 are actuated by the cams 168 and 174 as described with regard to FIGURE 4. However, the detents have reduced ends 192 and 194 which extend radially outwardly into elongated apertures or slots 196 and 198 formed in the spring retainer 186 so that they are in the normally locked position. When brake pressure is generated in the primary pressurizing chamber 36, the pressure acts on the piston 176 so that the cams 168 and 174 cause the detents to move inwardly until the detent ends 192 and 194 are radially inward of the spring retainer 184 and therefore in the unlocked position. Upon sufficient forward movement of the primary piston 32 to cause the detent ends to engage the forward ends of apertures 196 and 198 without pressure generation in chamber 36, the brake apply force is transmitted from the primary piston 32 through the detents to the spring retainer and then to the secondary pressurizing piston 34.

A master cylinder assembly, with several modifications, has been shown and described which will operate to transmit brake pedal pressure to a primary piston and a secondary piston under normal conditions so that brake fluid is pressurized in separate vehicle brake circuits. However, when pressure is not generated in the primary pressurizing chamber, the locking mechanism remains locked so that there is very little brake pedal travel loss before the brake pedal force is transmitted to the secondary piston, pressurizing fluid in the secondary pressurizing chamber even though no fluid is being pressurized in the primary pressurizing chamber.

In each of the modifications shown and described, the locking mechanism may be adapted to the secondary pressurizing piston instead of or in addition to the primary pressurizing piston. This may be accomplished by providing a lockable member similar to the lockable member formed by the spring retainer 48, 120, 144, 158, or 184, with its forward end abutting the end wall of the secondary pressurizing chamber, and the other locking and unlocking elements.

What is claimed is:

1. A dual master cylinder assembly for minimizing brake pedal travel loss upon the loss of pressure in one pressurizing chamber, said assembly comprising:
   a first fluid pressurizing piston operatively movable by a brake pedal to pressurize brake fluid in a first pressurizing chamber,
   a second fluid pressurizing piston normally movable by fluid pressure in the first pressurizing chamber to pressurize brake fluid in a second pressurizing chamber,
   and means selectively mechanically locking said first and second pressurizing pistons in compressive force transmitting relation so as to transmit brake pedal force from said first piston to said second piston, said means being responsive to a predetermined pressurization of fluid in the first pressurizing chamber to mechanically disconnect said first and second pressurizing pistons from force transmitting relation and to permit further pressurization of fluid in said first pressurizing chamber.

2. The assembly of claim 1, said locking means providing a lost motion connection when in locking relation to permit sufficient pressurizing movement of said first piston relative to said second piston to generate the predetermined fluid pressure in the first pressurizing chamber when there is no pressure loss condition existing.

3. The assembly of claim 1, said last-named means including
   a movable actuator having a wall with one side always exposed to fluid at substantially atmospheric pressure and the other side exposed to brake fluid at the pressure in the first pressurizing chamber.

4. The assembly of claim 1, said last-named means including
   a movable actuator having a wall with one side exposed to fluid at the pressure of the master cylinder fluid reservoir and the opposite side exposed to brake fluid at the pressure in the first pressurizing chamber,
   and spring means associated with said wall and opposing the first pressurizing chamber fluid pressure acting on said wall.

5. The assembly of claim 1, a spring retainer in the first pressurizing chamber abutting said pressure piston and in telescoping relation with an extension with said first pressurizing piston,
   a first pressurizing piston return spring in the first pressurizing chamber and acting on said first pressurizing piston and said spring retainer to urge said first and second pressurizing pistons apart,
   said first pressurizing piston extension having a pressure released lock means and said spring retainer having means associated with said lock means normally receiving said lock means in locking relation,
   spring means urging said lock means into locking engagement with said spring retainer means,
   and a pressure sensing piston cooperating with said lock means and sensitive to changes in fluid pressure in the first pressurizing chamber so that when the master cylinder assembly is actuated the increase in pressure in the first pressurizing chamber acts on said pressure sensing piston to move said lock means out of locking relation with said spring retainer means to release said lock means at a predetermined first pressurizing chamber pressure level and to permit said spring means to move said lock means back into locking relation with said spring retainer means when the pressure in the first pressurizing chamber falls below the predetermined pressure level.

6. The assembly of claim 5, said lock means having at least one detent pin moving laterally of said extension and urged outwardly by said spring means to lockingly engage said spring retainer means.

7. The assembly of claim 5, said lock means and said spring retainer means providing a lost motion connection when in locking relation to permit pressurizing movement of said pressurizing piston relative to said second pressurizing piston against the force of the pring of said piston return spring to permit an increase in pressure in the first pressurizing chamber sufficient to release said lock means when the master cylinder assembly is actuated and the pressure increases in a normal manner in both pressurizing chambers.

8. The assembly of claim 5, said lock means including a generally V-shaped sear attached to said pressure sensing piston with the outer ends of said sear providing detent pins movable laterally of said extension and outwardly under spring action of said spring means to locking relation with said spring retainer means, said spring retainer means including apertures receiving said detent pins, the legs of said sear intermediate the sear ends and the pivot connection of the sear with the pressure sensing piston being said spring means.

9. The assembly of claim 5, said lock means being at least two outwardly movable detent pins having cam surfaces formed adjacent the inner ends thereof,
said pressure sensing piston having a cam surface formed thereon on the side exposed to fluid pressure of the first pressurizing chamber,
and another cam-engaging cooperating cam surface on said detent pins having means cooperating therewith acting oppositely to said pressure sensing piston and with fluid pressure in the first pressurizing chamber to move said detent pins inwardly when the predetermined fluid pressure is attained in the first pressurizing chamber.

10. The assembly of claim 5, said spring retainer means having internal ratchet teeth and said lock means having cooperable ratchet teeth, said teeth being engaged when there is a pressure loss in said first pressurizing chamber while the brake is applied and after sufficient pressure has been initially generated in said first pressurizing chamber to release said lock means, thereby mechanically locking said first piston and said spring retainer means against relative movement in the pressurizing direction of movement.

11. A dual master cylinder assembly for minimizing brake pedal travel loss upon the loss of pressure in one pressurizing chamber, said assembly comprising:
a first fluid pressurizing piston operatively movable by a brake pedal to pressurize brake fluid in a first pressurizing chamber, a second fluid pressurizing piston normally movable by fluid pressure in the first pressurizing chamber to pressurize brake fluid in a second pressurizing chamber,
a lockable member connected with at least one of said pressurizing pistons,
and means selectively mechanically locking one of said pressurizing pistons in compressive force transmitting relation with said lockable member so as to transmit compressive force independently of and in place of fluid pressurization in one of said pressurizing chambers and permit fluid pressurization in the other of said pressurizing chambers by the other of said pressurizing pistons, said means being responsive to a predetermined pressurization of brake fluid in the one of said pressurizing chambers to disconnect said one pressurizing piston from force transmitting relation with said lockable member so as to permit further pressurization of brake fluid in said one pressurizing chamber.

References Cited

UNITED STATES PATENTS

| | | | |
|---|---|---|---|
| 2,065,176 | 12/1936 | Engel | 60—54.5 XR |
| 2,209,595 | 7/1940 | Brock | 60—54.5 XR |
| 3,312,062 | 4/1967 | MacDuff. | |

MARTIN P. SCHWADRON, Primary Examiner

ROBERT R. BUNEVICH, Assistant Examiner

U.S. Cl. X.R.

188—152